United States Patent Office 3,397,153
Patented Aug. 13, 1968

3,397,153
PROCESS FOR MANUFACTURING SINTERED SILICA GEL OF LOWERED BULK DENSITY AND CATALYST CONTAINING SAME
Roy J. Sippel, Wilmington, Del., assignor to E. I. du Pont de Nemours and Company, Wilmington, Del., a corporation of Delaware
No Drawing. Filed Dec. 23, 1965, Ser. No. 516,116
6 Claims. (Cl. 252—452)

ABSTRACT OF THE DISCLOSURE

A process for manufacturing a sintered silica gel of low bulk density from a mixture of a silica aquasol of average particle diameter D in the range of about 5 to about 100 millimicrons and a second silica aquasol of average particle diameter $d$ in the range of about 0.4 D to 0.8 D millimicrons, said sintered silica gel having a bulk density lower than a gel similarly prepared from either of the component sols alone. A salt of a catalytic metal may be incorporated in the gel.

This invention relates to sintered silica gels and silica gel derivatives prepared from mixtures of silica sols of differing particle sizes. It is more particularly directed to sintered silica gels and silica gel derivatives characterized by low bulk densities and to the manufacture of such gels by mixing a silica sol containing particles having an average diameter D in the range of about 5 to 100 millimicrons with a silica sol containing particles having an average diameter $d$ in the range of about 0.4 D to about 0.8 D millimicrons, converting the mixture of sols to a gel, and drying and sintering the gel. The invention is also directed to the novel mixtures of silica sols used as starting materials in the process.

Silica sols are commonly used to prepare silica gels and silica gel derivatives for use in catalytic processes. Catalyst users prefer gels having high total volume per unit weight of silica, i.e. low bulk density. Gels of low bulk density can, of course, be prepared from sols containing particles of relatively large size but the economic advantage gained from the decreased weight of silica per unit volume of the gel is more than offset by the cost of manufacturing the larger particle-size sols.

This invention provides a method of modifying the pore structures of silica gels and silica gel derivatives in order to reduce their bulk density. By the use of this invention catalyst manufacturers can choose the most economical combination of silica sols to provide a gel having a given bulk density and thus can tailor their catalysts to meet specific technical and economic requirements.

The invention is based upon the discovery that a mixture of silica sols can be used to produce a silica gel having a lower bulk density than a gel produced from either of the components sols alone. The difference in bulk density is due to the difference in pore structure in the gel when it is formed from a mixture of sols having different particle sizes.

In order to obtain the effect of the invention it is necessary that the average diameter $d$ of the particles of one sol of the mixture lie in the range of about 0.4 D to about 0.8 D millimicrons and preferably between about 0.45 D and 0.60 D millimicrons, where D ranges from about 5 to about 100 millimicrons and represents the average diameter of the particles of the second sol of the mixture. The sols can be mixed in any proportion and some decrease in the bulk density of the resulting gel will be observed. However, in order to achieve a substantial benefit from the invention it is preferred that about 20% to about 80% by weight of the particles in the mixture of sols have an average diameter D and (100–A) percent by weight of the particles have an average diameter $d$ of about 0.4 D to about 0.8 D millimicrons, where A is the percent by weight of particles of average diameter D.

The mixtures of sols used as starting materials can be prepared simply by blending the individual sols in the proper proportions. The art is familiar with methods for making the individual sols. Thus, sols of 5 to 8 millimicrons in diameter are described in United States Patent 2,750,345, issued June 12, 1956, to Guy B. Alexander. The preparation of sols containing particles up to 130 millimicrons in diameter is described in Bechtold and Snyder, U.S. Patent 2,574,902. U.S. Patent 2,631,134 issued March 10, 1953 to Iler and Wolter describes yet another process for making sols in the 10–150 millimicron range, and Dirnberger and Nelson, U.S. Patent 2,974,109, issued March 7, 1961, describes an improvement in this process.

The concentrations of the sols are not critical and can range from 1% up to as high as 70% total solids depending upon the particle sizes and the manner in which the sol is to be gelled.

The sols are converted into gels by any conventional means. For example, the liquid carrier can be removed by evaporation. Any stable sol will gel when evaporated. Alternatively gelling can be induced by the addition of an acid such as hydrochloric acid or citric acid or a salt such as magnesium sulfate or disodiumdihydrogen pyrophosphate. When a sol is to be gelled by acid or salt addition the permissible solids concentration will depend somewhat upon the size of the particles in the sol. Thus, for example, where a 7 millimicron particle sol is gelled by acid or salt addition the solids concentration of the sol should range between about 5 and 25% by weight. When a 100 millimicron sol is gelled by this method the solids content should range between about 50 and 85% by weight. All of these methods of converting sols to gels are well known to the art and no deviation from conventional practices is necessary for the successful operation of the invention.

Following gelation any remaining liquid carrier is removed by heating at a temperature above the boiling point of the carrier up to about 300° C., or higher in the case of gels prepared from sols containing larger particle sizes. If desired, drying can be carried out under vacuum in order to accelerate the procedure or permit the use of lower temperatures. The dried silica gel is thereafter sintered by heating in a furnace at a temperature in the range of about 300–600° C. for a period of time ranging from about 12 to 18 hrs.

Silica gel derivatives such as those described in U.S. Patent 2,904,580 to Idol can also be prepared by the method of this invention to provide catalysts having modified pore structures and decreased bulk density. Thus, for example, the mixture of silica sols can have added thereto a salt of such catalytic metals as bismuth, tin, antimony, nickel, molybdenum, tungsten, ruthenium, palladium, and silver. The salt can then be co-gelled with the mixture of silica sols according to the procedure described in the Idol patent. After sintering the gels so prepared are ready for use as catalysts. It will be understood that the term "silica gel" as used in the claims is intended to include such silica gel derivatives.

The invention will be further described by the following illustrative examples:

EXAMPLE 1

A silica sol having particles of average diameter 12 millimicrons is prepared by the method of Example 3 of Bechtold and Snyder, U.S. Patent 2,574,902. The sol contains 30% silica and has a weight ratio of $SiO_2$ to $Na_2O$ of 90.

A second silica sol having particles of average diameter 25 millimicrons is prepared, again using the method of Example 3 of the Bechtold and Snyder patent. This sol also contains 30% silica and has a weight ratio of $SiO_2$ to $Na_2O$ of 90.

The above sols are mixed in the proper proportions to provide sols having particle distributions as follows:

Sol. No. 1.—40% by weight 12 millimicron particles; 60% by weight 25 millimicron particles.

Sol No. 2.—60% by weight 12 millimicron particles; 40% by weight 25 millimicron particles.

Sol. No. 3.—20% by weight 12 millimicron particles; 80% by weight 25 millimicron particles.

The mixtures of sols are next acidified to a pH of 5.5 with dilute hydrochloric acid and allowed to gel at room temperature. The gels are then dried to constant weight in a circulating air oven at about 100° C.

The dried gels prepared as above are next sintered in a furnace at 540° C. for 16 hours. The product is then ground in a mortar and pestle.

The ground gels are then screened using standard U.S. Sieves and the following fractions are isolated: −40+60 mesh, −60+80 mesh, −80+100 mesh. A test sample of each gel is then made by mixing equal weights of these particle size ranges.

Bulk density of each gel sample is then determined using a Scott, Schaeffer, and White Volumeter.

It is found that each of the gels prepared as above exhibits a lower bulk density than a gel prepared from either a 12 millimicron sol or a 25 millimicron sol alone. The greatest reduction of bulk density is exhibited by sol No. 2 which contains a mixture of 60% 12 millimicron particles and 40% 25 millimicron particles. The bulk density of this gel is approximately 16% below that of a gel prepared from 25 millimicron particles.

EXAMPLE 2

A silica sol having particles of average diameter 41 millimicrons is prepared by the method of Example 3 of Bechtold and Snyder U.S. Patent 2,574,902. The sol contains 30% silica and has a weight ratio of $SiO_2$ to $Na_2O$ of 90.

A second silica sol having 100 millimicron particles is prepared according to Example 1 of U.S. Patent 3,012,972 as follows: 1 gallon of a silica sol containing 30% $SiO_2$ in the form of colloidal particles which are essentially discrete spheres having an average diameter of 15 millimicrons as determined from an electron micrograph and containing 0.33% by weight $Na_2O$ is deionized as completely as possible by treatment with ion-exchange resins. Thus, the sol is deionized to pH 2.7 with "Dowex" 50 cation exchange resin in the hydrogen form, filtered, deionized with "Amberlite" IR 45 anion-exchange resin in the hydroxyl form to pH 5.6, filtered, and deionized with a mixture of the two resins to pH 3.2. The sol is diluted with two volumes of distilled water and heated in a stainless steel autoclave at 325° C. for 6 hours. At this point the sol contains 10.6% silica, has a pH of 8.0 and has an average particle diameter of about 100 millimicrons. The sol is then concentrated by evaporating off water.

The sol made by this process contains 33% silica and a weight ratio of $SiO_2$ to $Na_2O$ of 600.

The above sols are blended in the proper proportions to provide a mixture containing 50% by weight 41 millimicron particles and 50% by weight 100 millimicron particles.

The mixture of sols is next evaporated to dryness and heated at 540° C. for 16 hours. Subsequently it is ground with a mortar and pestle and a test sample is prepared by screening as described in Example 1.

The bulk density of this gel is found to be significantly lower than the bulk density of a gel prepared from either 41 millimicron particles or 100 millimicron particles alone.

EXAMPLE 3

A silica sol having particles of 78 millimicrons average diameter is prepared by the method of Example 3 of the Bechtold and Snyder Patent U.S. 2,574,902. This sol is then mixed with a sol containing 100 millimicron particles prepared by the method described in Example 2. The sols are mixed in the proper proportion such that 50% by weight of the particles have an average diameter of 78 millimicrons and 50% by weight have an average diameter of 100 millimicrons.

A silica gel is prepared by evaporating the above mixture of sols to dryness. The gel is then sintered by heating at 540° C. in a furnace for 16 hours. The bulk density of this sintered gel is found to be significantly lower than the bulk density of the gel prepared from either 78 millimicron particles or 100 millimicron particles alone.

EXAMPLE 4

A silica sol containing particles of 7 millimicron average diameter is prepared by a method described in Alexander, U.S. Patent 2,750,345. The sol contains particles of 440 m.$^2$/g. specific surface area at a concentration of 14.6% $SiO_2$ and a $SiO_2$ to $Na_2O$ ratio of 52.

A silica sol containing particles of 10 millimicron average diameter is prepared by a method described in the above Alexander patent. This sol contains particles of 300 m.$^2$/g. specific surface area at a concentration of 18.0% silica. The ratio of $SiO_2$ to $Na_2O$ is 90.

A mixture of these sols is prepared by blending the sols in the proper proportion to give a mixture in which 80% by weight of the particles have an average diameter of 7 millimicrons and 20% of the particles have an average diameter of 10 millimicrons.

The mixture of sols is gelled by addition of dilute hydrochloric acid to a pH of 5.5. The resulting gel is dried to constant weight in a circulating air oven at about 100° C. The gel is then sintered in a furnace at 300° C. for 14 hours.

The sintered silica gel is then ground and a test sample is prepared by mixing equal weights of particles in the size ranges −40+60 mesh, −60+80 mesh, −80+100 mesh.

The bulk density of this gel measured by the method described in Example 1 is found to be below that of a gel prepared from a sol containing either 7 millimicron particles or 10 millimicron particles alone.

EXAMPLE 5

A silica sol containing particles of average diameter 5 millimicrons is prepared by a method described in Alexander, U.S. Patent 2,750,345. The concentration of this sol is 15% by weight $SiO_2$. The $SiO_2$ to $Na_2O$ ratio is 150. The specifice surface area of the particles is 600 m.$^2$/g.

This sol is then blended with a sol containing 10 millimicron particles as described in Example 4. The sols are mixed in the proper proportion to provide a mixture in which 50% of the particles have an average diameter of 5 millimicrons and 50% of the particles have an average diameter of 10 millimicrons.

The mixture of sols is then acidified by addition of dilute HCl to a pH of 5.5. The gel is dried under vacuum at 110° C. and is then sintered in a furnace at 300° C. for 14 hours.

The sintered gel is then ground in a mortar and pestle and a test sample is prepared by mixing equal weights of particles in the size ranges −40+60 mesh, −60+80 mesh, and −80+100 mesh. The bulk density of the gel is then determined by the method described in Example 1. It is found that the gel exhibits a significantly lower bulk density than a gel prepared from either 5 millimicron particles or 10 millimicron particles alone.

EXAMPLE 6

A silica gel derivative is prepared in a method analogous to that described in Example 1 of U.S. Patent 2,904,580. A solution containing 9.3 cc. of 85% phosphoric acid, 272 grams of molybdic acid (85% $MoO_3$), 40 cc. of nitric acid, and 582 grams of $Bi(NO_3)_3$, $8H_2O$ in 400 cc. of water is added to 750 grams of an aqueous colloidal silica sol containing 30% silica. The silica sol used is a mixture of silica sols identified as sol No. 2 in Example 1 in which 60% by weight of the particles have an average diameter of 12 millimicrons and 40% by weight of the particles have an average diameter of 25 millimicrons.

The mixture is evaporated to dryness and heated at 540° C. for 16 hours.

The silica gel so produced is useful as a catalyst in the preparation of acrylonitrile from the reaction of propylene and ammonia.

The invention claimed is:

1. A process for manufacturing a sintered silica gel of lowered bulk density comprising the steps of mixing
    (A) about 20 to 80% by weight of a colloidal silica aquasol of average particle diameter D in the range of about 5 to about 100 millimicrons; and
    (B) (100–A) percent by weight of a second colloidal silica aquasol of average particle diameter $d$ in the range of about 0.4 D to 0.8 D millimicron
        where A is the percent by weight of particles of average diameter D in the mixture;
followed by:
    (C) converting the mixture of sols to a gel;
    (D) drying the gel at a temperature of between 100 and 300° C., and
    (E) sintering the dried gel at a temperature of 300 to 600° C.;
said dried, sintered gel having a bulk density lower than a gel similarly prepared from either of the component sols alone.

2. A process as defined in claim 1 wherein $d$ is in the range of about 0.45 D to about 0.6 D.

3. A process according to claim 1 wherein a salt of a catalytic metal is added to the mixture of sols.

4. A process according to claim 3 wherein said catalytic metal is selected from the group consisting of bismuth, tin, antimony, nickel, molybdenum, tungsten, ruthenium, palladium and silver.

5. A process according to claim 1 wherein a salt of a catalytic metal is added to said gel.

6. A process according to claim 5 wherein said catalytic metal is selected from the group consisting of bismuth, tin, antimony, nickel, molybdenum, tungsten, ruthenium, palladium and silver.

References Cited
UNITED STATES PATENTS

| | | | |
|---|---|---|---|
| 1,896,055 | 1/1933 | Patrick et al. | 252—317 X |
| 2,330,640 | 9/1943 | Teter | 252—317 X |
| 2,956,958 | 10/1960 | Iler | 252—313 |
| 3,165,379 | 1/1965 | Schwartz | 252—317 X |

LEON D. ROSDOL, *Primary Examiner.*

RICHARD D. LOVERING, *Assistant Examiner.*